(12) United States Patent
Sadoway et al.

(10) Patent No.: US 8,268,471 B2
(45) Date of Patent: Sep. 18, 2012

(54) HIGH-AMPERAGE ENERGY STORAGE DEVICE WITH LIQUID METAL NEGATIVE ELECTRODE AND METHODS

(75) Inventors: Donald Sadoway, Watertown, MA (US); Gerbrand Ceder, Wellesley, MA (US); David Bradwell, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1194 days.

(21) Appl. No.: 11/839,413

(22) Filed: Aug. 15, 2007

(65) Prior Publication Data
US 2008/0044725 A1    Feb. 21, 2008

Related U.S. Application Data

(60) Provisional application No. 60/837,657, filed on Aug. 15, 2006.

(51) Int. Cl.
*H01M 4/36* (2006.01)
(52) U.S. Cl. ........ 429/103; 429/102; 429/101; 429/105; 429/125
(58) Field of Classification Search .................. 429/101, 429/102, 103, 105, 125
See application file for complete search history.

(56) References Cited

U.S. PATENT DOCUMENTS

| | | | | |
|---|---|---|---|---|
| 3,245,836 A | * | 4/1966 | Agruss | 429/419 |
| 3,419,432 A | | 12/1968 | Hesson | |
| 3,488,221 A | | 1/1970 | Shimotake et al. | |
| 3,663,295 A | * | 5/1972 | Baker | 429/102 |
| 3,775,181 A | * | 11/1973 | Ryerson | 429/103 |
| 3,870,561 A | * | 3/1975 | Charbonnier et al. | 429/102 |
| 3,933,521 A | | 1/1976 | Vissers et al. | |
| 4,065,602 A | * | 12/1977 | Roche et al. | 429/72 |
| 4,216,273 A | | 8/1980 | Cadart et al. | |

FOREIGN PATENT DOCUMENTS
EP    0078404 A2    5/1983

OTHER PUBLICATIONS

Weaver, Robert D. et al. "The Sodium/Tin Liquid-Metal Cell." J. Electrochem. Soc., vol. 109, Issue 8, pp. 653-657 (1962).*
E.J. Cairns & H. Shimotake, High-Temperature Batteries, Science, Jun. 20, 1969, pp. 1347-1355, vol. 164, No. 3886, American Association for the Advancement of Science.
Shimotake et al., Secondary Cells With Lithium Anodes and Immobilized Fused-Salt Electrolytes, I&EC Process Design and Development, Jan. 1, 1969, pp. 51-56, vol. 8, No. 1.
Shimotake & E.J. Cairns, Bimetallic Galvanic Cells with Fused-Salt Electrolytes, Reference 85, Conference Proceedings From ILB pp. 951-962, 1987.
"Notification of Transmittal of the International Search Report and the Written Opinion of the International Searching Authority, or the Declaration," International Filing Date: Aug. 15, 2007, International Application No. PCT/US2007/018168, Applicant: Massachusetts Institute of Technology, Date of Mailing: Sep. 18, 2008, pp. 1-13.

* cited by examiner

*Primary Examiner* — Barbara Gilliam
*Assistant Examiner* — Zachary Best
(74) *Attorney, Agent, or Firm* — Sunstein Kann Murphy & Timbers LLP (57) ABSTRACT

An electrochemical method and apparatus for high-amperage electrical energy storage features a high-temperature, all-liquid chemistry. The reaction products created during charging remain part of the electrodes during storage for discharge on demand. In a simultaneous ambipolar electrodeposition cell, a reaction compound is electrolyzed to effect transfer from an external power source; the electrode elements are electrodissolved during discharge.

55 Claims, 5 Drawing Sheets

HIGH-AMPERAGE ENERGY STORAGE DEVICE WITH LIQUID METAL NEGATIVE ELECTRODE AND METHODS

CROSS-REFERENCE TO RELATED APPLICATION

The present application claims the benefit of U.S. Provisional Patent Application Ser. No. 60/837,657, which was filed on Aug. 15, 2006, by Donald R. Sadoway et al. for a HIGH-AMPERAGE ENERGY STORAGE DEVICE and is hereby incorporated by reference.

BACKGROUND OF THE INVENTION

1. Field of the Invention

The invention relates to high-capacity electrical energy storage. In particular, this invention provides novel electrochemical cells and batteries for large-scale and commercial energy management. More particularly, techniques for delivering and receiving electrical energy by simultaneous ambipolar reversible electrochemical metal extraction in a high-temperature, all-liquid system is described.

2. Background Information

Balancing supply and demand of electrical energy over time and location is a huge unsolved problem in an array of applications all along the course from commercial generator to consumer. The resulting systemic strain reduces the dependability of the supply, causing consumers inconvenience and loss of revenue. Since most electrical energy generation in the United States relies on the combustion of fossil fuels, suboptimal management of electrical energy has a negative environmental impact through excessive emissions of pollutants and greenhouse gases. Moreover, renewable energy sources like wind and solar power are active only intermittently, thus limiting the scale of their deployment in the absence of large-scale storage systems.

Several types of energy storage devices have been proposed to support large-scale and commercial electrical energy management. For example, pumped hydro-storage has been economically used for storing electrical energy for plant load-leveling. Pumped hydro-storage uses a turbine to pump water up a hill. The water is held in a reservoir on the hilltop several hundred feet above a reservoir such as a lake. During the daily high demand period the water is released and the turbine runs in reverse to generate electricity. Although existing hydro-storage systems, mostly built 30 to 40 years ago, operate relatively inexpensively, they are expensive to build. Also, a reservoir sufficient to support an 8-hour discharge translates to a sizeable physical footprint. The technology is inflexible with respect to location, limited to siting on a large, unpopulated flat-topped mountain near an urban setting and close to existing transmission lines.

Electrochemistry-based technologies are more competitive in terms of combining flexibility and compactness with the requisite storage capacity. Conventional lead-acid batteries are the traditional form of large-scale electrochemical energy storage. Highcapacity electricity storage facilities, on the order of 10 MW, have been built using lead-acid cells in vast arrays that are neither compact nor easily relocated. Although they are the cheapest commercial battery technology on the market, their limited cycle life, on the order of several hundred charge-discharge cycles, limits their performance in uses involving frequent activation, such as daily power management. They do not respond well to fast charging or discharging, which lowers their efficiency and reduces their lifespan, as does deep discharge cycling.

Sodium-sulfur ("NAS") batteries were developed for use in automobiles, but have been adapted to large-scale power management facilities in the US and Japan. The molten sodium and sulfur electrodes sandwich a beta-alumina solid electrolyte. The cell operates at a temperature around 325° C. in a thermal enclosure. The sodium ions pass through the electrolyte to react with sulfur to form a polysulfide. The sulfur is nonconductive and so requires a complex electrode surface to maximize the triple-phase boundary between sulfur, the current collector, and the electrolyte. Thus, the sulfur and polysulfide are held in a carbon-sponge matrix to promote interphase contact.

The technology provides a sufficiently compact apparatus that exhibits an acceptable cycle-life for daily deep-discharges, but there are downsides. The sponge electrode is difficult to manufacture and susceptible to corrosion. The ceramic electrolyte material is fragile and sensitive to thermal shock. Increasing its thickness enhances structural strength but increases the cell's internal resistance, thereby reducing the ion flux and thus the current density during operation. Also, large ceramic bodies of thin cross section are difficult and costly to manufacture. Thus, the design of the cell is constrained by tradeoffs among conductivity, reliability, and ease of manufacturing, so that the cells are not really scalable. Due to the resulting electrolyte size limitations, multiple cells are assembled into long cylinders. An apparatus requires over 20,000 cylinders per MW capacity. Using an array of such a large number of cells complicates integration with, and increases the cost of, the power electronics for interfacing with an AC system.

Despite a longfelt need, a robust energy storage device combining capacity, economy, flexibility and long life has not emerged.

SUMMARY OF THE INVENTION

The invention provides apparatus and method for high-amperage electrical energy storage and transfer in the form of a self-contained electrolysis cell. The cell is charged by receiving current from a charging circuit so as to drive electrolysis of the cell electrolyte. The cell of the invention is constituted so that the products of electrolysis remain available to react and recombine, thereby allowing the stored electrical energy to be discharged on demand to provide current to an external load circuit.

An aspect of this invention is that liquid-phase materials not heretofore used as components in an electrochemical cell can be anodically deposited. These anodically deposited liquid materials have electronic properties capacitating them to serve as an electrode in a cell. Namely, a metalloid—such as tellurium, antimony or bismuth—behaves as a nonmetal in forming compounds with metals. In the liquid phase, however, these metalloids behave as liquid metals in that they are electronic conductors. This confluence of properties makes possible the extraction of a liquid-phase electronic conductor from a molten salt by oxidation as part of ambipolar electrochemical metal extraction in which metal is also extracted by reduction at the electrode of opposite polarity.

The cell implementing the ambipolar electrodeposition has a liquid metalloid positive electrode and a liquid metal negative electrode, both in contact with a liquid electrolyte dissolving a reaction compound of the metal and metalloid. As used herein, the phrase reaction compound denotes the metal-metalloid compound that is decomposed and recombined in the overall cell reaction.

During charging, current from a charging source, external to the cell and coupled to the liquid electrodes through current collectors, is driven through the cell so as to decompose the reaction compound. Under these conditions, metalloid ions in the electrolyte migrate to and react at the interface between the electrolyte and the positive electrode to produce neutral liquid metalloid that is incorporated by the positive electrode; similarly, metal ions in the electrolyte migrate to and react at the negative electrode to produce neutral metal which enlarges the negative electrode. The materials deposited at the electrodes represent stored electrical energy which persists indefinitely, as long as the external electronic path joining the two electrodes is left open. The electrodes and electrolyte are maintained at liquid-range temperatures, so the electrode species remain available for immediate recombination via an electrochemical pathway. Providing an external electronic pathway between the electrodes in the form of an external load circuit effects discharging, by permitting recombination of the deposited elements, thereby making the stored energy available to the load circuit.

The metal for the negative electrode, metalloid for the positive electrode, and electrolyte composition are chosen conjunctionally to implement ambipolar electrochemical metal extraction effecting energy storage and delivery according to the invention. The metal and metalloid are both liquid under cell operating conditions, and also form a mutual reaction compound with adequate solubility in a supporting electrolyte. The densities of the immiscible liquids have relative magnitudes compatible with the cell architecture. Based on these considerations, preferred material candidates for the negative electrode of the invention include alkali and alkaline-earth metals such as lithium, sodium, potassium, magnesium, calcium and other low-melting metals such as cadmium and zinc. Metalloids for the positive electrode include pnicogens—such as arsenic, antimony and bismuth—and chalcogens—such as selenium and tellurium.

Although the liquid electrodes of the invention rely on the physical and electrical properties of the chosen metalloid and metal chemical elements, these electrodes are not limited to pure mono-elemental chemical compositions but may include alloying constituents in order, for example, to tailor physical properties or to enable electrochemical monitoring of the extent of discharge, as is well known to those skilled in the electrochemical arts.

The electrolyte of the invention may be a molten salt comprising the reaction compound and one or more supporting compounds in which the reaction compound is dissolved. The supporting compounds typically enhance ionic conductivity and/or inhibit electronic conductivity through the electrolyte.

A cell reaction producing electronically conductive liquid reaction products at both electrodes allows the system to function reversibly, enabling the application of the technology to energy storage. Unlike known electrometallurgical cells, which generate fugitive gaseous products at the anode, electrolysis in the cell of the invention produces a liquid product that remains at the positive electrode, in contact with the electrolyte, available to participate in the reverse reaction for discharging on demand.

The fact that the reactions at both electrodes occur entirely in the liquid state results in exceptionally high rate of reactions. When an electrochemical reaction involves species of different states of matter the kinetics of the reaction are constrained by the nucleation of products. For example, when a gas is produced there is an activation energy associated with the generation of gas on a solid substrate. Remedies include the use of catalysts in order to accelerate the rate of reaction. In stark contrast, the generation of liquid product from a liquid electrolyte without even the presence of a solid substrate at the site of reaction occurs at the highest reaction rates known to electrochemistry. The reaction is unimpeded by the nucleation of a foreign phase in a different state of matter. Furthermore, electronic conductivity of the liquid electrodes imparts fast kinetics to the cells of the invention through two means. In the first place, it enables electron transfer reactions to occur over the entire liquid element-electrolyte interfaces rather than being limited to triple-phase intersections. Secondly, it eliminates product diffusion away from the electrode, which is often a rate-limiting step in conventional batteries: when a metal ion in the melt gains electrons from the molten electrode, it instantly becomes part of the electrode. Furthermore, the high cell operating temperatures, greater than 500° C., or even greater than 700° C., necessary to exploit these chemistries facilitate reaction kinetics and ion migration. The accumulated contributions of these features are expected to produce current densities on the order of several amperes per square centimeter, rivaling those of electrochemical aluminum smelters, with efficiencies on the order of 80%.

The invention is compatible with a variety of cell configurations. In one cell configuration, the liquid densities of the cell constituents increase in the order negative electrode/ electrolyte/positive electrode so that the three immiscible layers self-assemble in sequence with electrical connection to a charging source or external load circuit being made to positive and negative current collectors at the lower and upper ends of the cell, respectively.

In one chemistry compatible with this configuration, molten magnesium antimonide $Mg_3Sb_2$ is electrochemically decomposed to produce liquid magnesium and liquid antimony during charging. At an operating temperature of about 700° C., an electronically conductive pool of molten magnesium, lower in density than the electrolyte and insoluble therein, floats on a layer of electrolyte and functions as the negative electrode. An electronically conductive layer of liquid antimony, higher in density than the electrolyte and insoluble therein, is disposed under the electrolyte and functions as positive electrode. During charging, the current collector provides electrons to the negative electrode, thereby reducing magnesium cations at the electrolyte interface to magnesium metal, which accrues to the negative electrode. Antimony anions simultaneously release electrons to the positive electrode to form neutral antimony which accrues to the positive electrode. The accrued antimony and magnesium remain in the electrodes until the cell is operated in discharge mode by connecting the current collectors across an external load. During discharge current flows out of the cell as the magnesium is oxidized to cations and the antimony is reduced to anions so as to reconstitute magnesium antimonide.

In another chemistry compatible with the three-layer configuration, the reaction compound is magnesium telluride MgTe, dissolved in an electrolyte also including sodium telluride $Na_2Te$, sodium selenide $Na_2Se$ and magnesium selenide MgSe. The cell operates at about 700° C. and produces liquid magnesium and liquid tellurium at the respective electrodes.

In another cell configuration, a metal and metalloid, both having densities greater than the density of the electrolyte, are disposed side by side yet electronically isolated from one another on the cell bottom and coupled to distinct current collectors with the electrolyte lying overtop and in contact with both electrodes.

In a preferred chemistry configured this way, the reaction compound is zinc telluride ZnTe. The reaction compound is dissolved in molten zinc chloride. The liquid electrolyte is lower in density than zinc or tellurium and overlays the liquid zinc negative electrode and liquid tellurium positive electrode. At an operating temperature around 710° C., charging deposits the respective conductive liquid on each electrode. During discharge, the elements recombine to their mutual compound.

In one embodiment a single ambipolar electrodeposition cell of the invention operates to store and transfer energy. In another embodiment, a battery comprises a plurality of interconnected cells of the invention.

The high-amperage energy storage technology of the invention is able to operate at extreme temperatures, such as arctic cold and desert heat, without restriction on geographical location and is realizable in a mobile structure. The all-liquid system is durable, avoiding common failure mechanisms experienced by systems that use a solid electrolyte or electrodes and/or involve a phase change. The power capacity is large and scalable for adaptation to a variety of large-scale and commercial power management applications.

BRIEF DESCRIPTION OF THE DRAWINGS

The foregoing discussion will be understood more readily from the following detailed description of the invention, when taken in conjunction with the accompanying drawings, in which like reference numerals indicate identical or functionally similar elements:

FIGS. 5A-5C are perspective views, in which

It will be appreciated that, for purposes of illustration, these figures are not necessarily drawn to scale.

DETAILED DESCRIPTION OF AN ILLUSTRATIVE EMBODIMENT

The deployment of high-amperage electrical energy storage equipment, capable of rapidly receiving and dispatching electricity, could play a revolutionary role in addressing the market and societal impacts of supply-demand mismatch. However, a single storage technology adaptable to assorted needs along the distribution trajectory has been elusive. Although details vary according to the individual application, the features desirable in an electrical energy storage technologies for addressing large-scale supply and demand variabilities include the following: physical footprint smaller than about 100 $m^2$/MW; robustness with respect to movement and changes in environment; cycle life greater than 3000 deep discharge cycles; lifespan of 10 to 15 years; DC-to-DC efficiency of about 75% to 85%; power capacity from about 10 kW to greater than 10 MW; discharge capacity from about 4 to 10 hours; response time less than 100 ms; minimal maintenance; zero noise and zero emissions.

The first application point is at the generator. Electrical power demand by end users varies over time. This reality creates difficulties that propagate upstream, all the way to the power plant. The diurnal fluctuation in energy demand reduces plant efficiency, thereby increasing emissions, by preventing generator operation at optimum output levels around the clock. A high-capacity electrical energy storage apparatus, with a power capacity greater than 1 MW, could allow load-leveling, which is effected by downloading power from the generator to a storage device during low-demand periods and then uploading power to the grid during times of higher demand, permitting the power plant to operate at a constant level.

Conversely, it is variability in supply that makes management of power generated by renewable sources challenging. Renewable sources, such as wind and solar energy, generate only intermittently: wind turbines only function during periods of strong, steady wind; photovoltaic panels need sunshine. During peak demand hours, additional power generators must be standing by to operate in the event that the wind stops blowing or the sky clouds over. The underutilized capital in the form of excess power stations ultimately limits the scale of deployment of renewable energy sources. Furthermore, as a turbine or solar panel turns on or off, it causes voltage spikes and dips or shifts in frequency, creating additional strain on the power grid and leading to reduced power quality. A reliable high-capacity electrical storage device used in conjunction with a renewable energy source could provide dedicated load leveling thereby supporting implementation of renewable energy sources on grid. Such a combination could also support the use of intermittent renewable energy sources as an alternative to generators in remote, off-grid locations to which periodic delivery of fuel would be difficult.

Whether generated conventionally or by renewable sources, electricity is then transmitted from the source along power lines to a load center and then sent through the local distribution system for delivery to consumers. The transmission and distribution systems have no storage capacity, so the grid must meet instantaneous demand. As the load on a transmission line approaches its capacity, it incurs heavy ohmic losses which decrease its efficiency. Furthermore, the resulting resistive heating can melt system components and cause transmission line failure. Preventive measures available to power providers include rolling blackouts, brownouts or the use of portable generators to boost supply at the load center. Generators of the requisite power capacity (tens of MW) are noisy, polluting, and require periodic refueling. Upgrading or replacing transmission lines as they reach capacity limits is very expensive and frequently meets with public opposition. Construction can take as long as five years.

A portable energy storage unit located near a load center could supply a portion of the energy carried by the transmission line during peak hours of the day, thereby mitigating load demands on the line. Ideally, the storage unit would provide a significant portion, say 2% to 20% of the line's capacity, which is typically on the order of 500 MW. Such a unit could defer the need for a transmission line upgrade. Alternatively, a storage unit could be deployed to supply emergency power after a system failure or to maintain power delivery during construction of new lines and then be relocated when no longer needed.

Distribution systems from load centers suffer similar problems, albeit at much lower loads, and could be similarly addressed using a portable power storage unit.

Commercial consumers requiring a constant supply of electricity are especially vulnerable to blackouts. Auxiliary generators are less than ideal for backup because they require time to reach full output levels. These consumers would benefit from backup power systems, or uninterruptible power systems ("UPS") configured to provide electricity to such a facility in the event of a grid-power failure. A charged highcapacity storage unit configured to discharge when the power is interrupted could function in that role.

A facility that is sensitive to voltage irregularities would be adversely affected by brownouts or other inconsistencies in delivered power. A UPS in the form of a charged high-capacity storage unit configured to discharge to eliminate deviations from the desired power level could act as a buffer between the grid and the facility to ensure high power quality.

Figure 1:
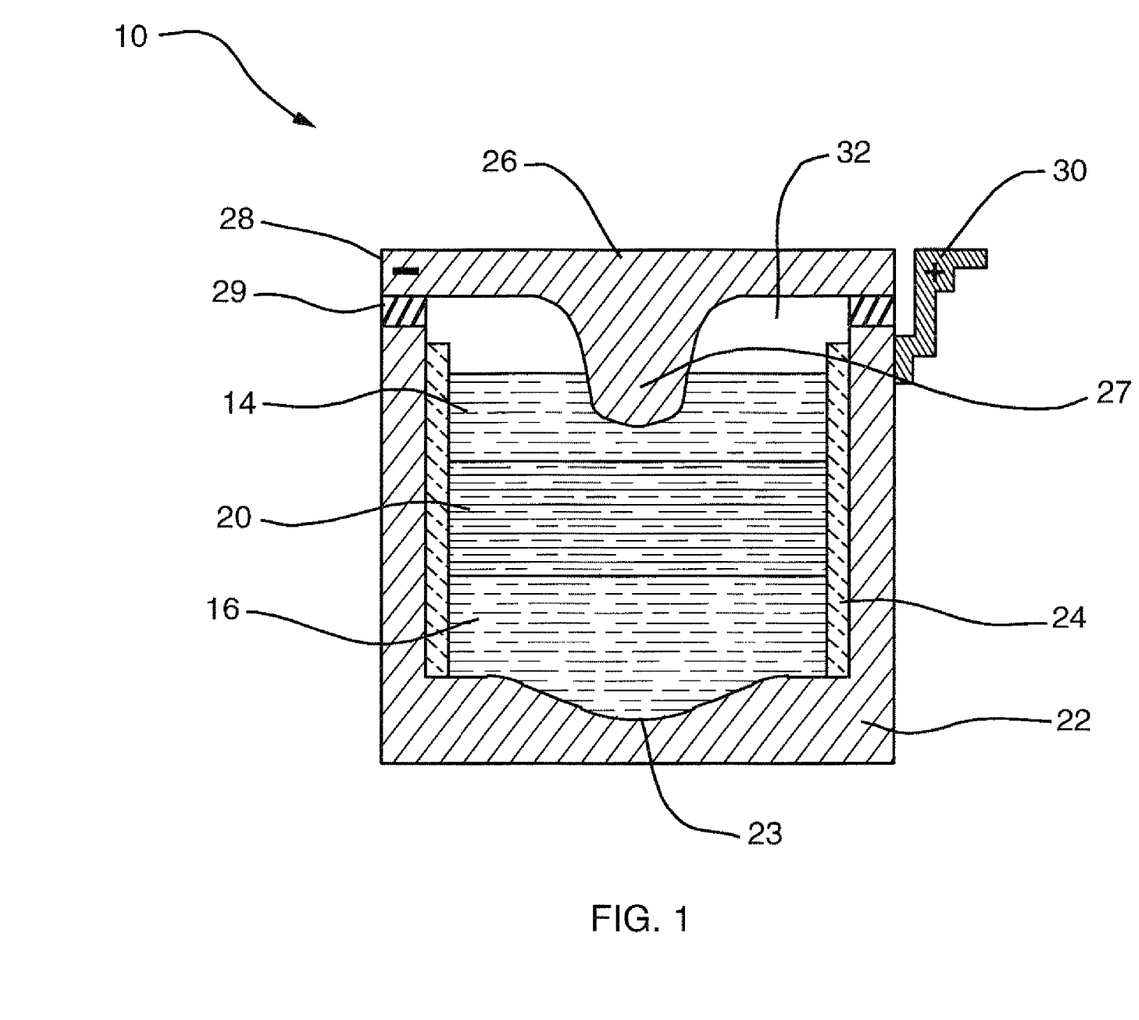
FIG. 1 is a vertical section showing a self-assembling ambipolar electrodeposition cell of the invention.

With reference to FIG. 1, an energy storage cell 10 of the invention houses three liquid constituents: a molten metal layer 14 that serves as negative electrode; a liquid metalloid layer 16 that serves as positive electrode; and an intervening ionically conductive electrolyte 20. The liquid constituents are housed in a conductive container 22 which provides mechanical support to an inner sheath 24. The sheath 24 prevents shorting by electronic conduction between the negative electrode 14 and the positive electrode 16 through the container 22. The sheath 24 also protects the conductive container 22 from chemical attack by corrosive salts in the electrolyte 20.

The cell is covered by a conductive lid 26. An insulative seal 29 electrically insulates the lid 26 from the container 22 and confines molten constituents and vapors to the container 22. The portion of the lid 26 in contact with the negative electrode 14 functions as a negative current collector 27, through which electrons pass between the molten electrode 14 and an external source or sink by way of a negative terminal 28.

The portion of the container 22 in contact with the positive electrode 16 functions as a positive current collector 23, through which electrons pass between the molten electrode 16 and an external source or sink by way of a positive terminal 30. The placement of the negative terminal 28 and the positive terminal 30 facilitates arranging individual cells in series by connecting the positive terminal of one cell to the negative terminal of another cell.

An inert gas layer 32 overlaying the negative electrode 14 accommodates volume changes in the three-constituent system during charging and discharging. Optionally, the lid 26 or seal 29 incorporates a safety pressure valve.

For many reaction chemistries, steel has the requisite conductivity, strength and resistance to attack to serve as a material for the container 22 and the lid 26. The material for the sheath 24 is electronically insulating and provides corrosion resistance against the two liquid electrode elements 14 and 16 and the molten electrolyte 20. In one design, the sheath 24 is made of alumina. In another design, especially suitable for very large cells, the sheath is a wall of frozen electrolyte, as is used in aluminum production.

In yet another design, a wall of alumina blocks, several blocks thick, plays the protective role of the sheath 20. The exterior of the cell is exposed to the ambient temperature while the interior of the sheath is at the operating temperature. In this case, molten electrolyte can seep into the cracks between the alumina blocks, cooling to the temperature at which the electrolyte solidifies. Any new crack, which, for example, may form in service due to thermal shock, is automatically healed by further electrolyte seepage. This design would require internal heating for the initial cell warm up but would reduce the amount of external thermal insulation needed.

Materials such as magnesia cement, aluminoborate glasses, and other high-temperature sealants as known to those skilled in the art of high-temperature battery systems are suitable for the seal 29.

The liquid electrolyte 20 comprises a liquid solution of a supporting electrolyte consisting of one or more salts into which is dissolved the reaction compound formed by chemical reaction of the electrode elements. The reaction compound is present in the form of its component ions. For a given mass of supporting electrolyte, the quantity of the electrode elements available to react in the cell 10, which corresponds to the energy storage capacity of the cell, will be directly proportional to the maximum solubility of reaction compound in the supporting electrolyte. For a given target energy storage capacity, the lower the solubility limit of the reaction compound in the supporting electrolyte, the greater the mass of supporting electrolyte needed to achieve the target. A greater mass of supporting electrolyte translates to a relatively thicker electrolyte layer 20, with a relatively higher internal resistance resulting in a lower output voltage.

The supporting electrolyte can impart other attributes to the liquid electrolyte 20, such as a lower melting temperature. Other additives may enhance various physical and chemical properties in ways that contribute melting point depression or otherwise reduce viscosity of the liquid electrolyte 20. The supporting electrolyte and any other additive have free energies of formation more negative than that of the reaction compound so that they electrodeposit at potentials of greater magnitude than the decomposition potential of the reaction compound, limiting the electrolysis products to the liquid elements constituting the electrodes. These and other considerations informing the choice of electrolyte composition are known to those skilled in the electrochemical arts.

The electrode composition may likewise be modified to tailor its physical properties. An optional electrode additive may, for example, function to alter the cell potential so as to indicate the approach of complete discharge of the cell 10. A solvent metal or metalloid may be chosen so as to alter the bulk density of the liquid electrode.

A cell containing a molten metal layer 14 of magnesium (density 1.5 g/ml, melting point 650° C.), a liquid metalloid layer 16 of antimony (density 6.5 g/ml, melting point 630° C.) and an appropriate electrolyte 20 containing magnesium antimonide (density 4 g/ml, melting point 1245° C.) is a system of immiscible liquids having the requisite conductivity modes that can self-assemble into the layers shown in FIG. 1 upon melting, providing for simple manufacture and assembly from billets. A cell containing these constituents preferably operates around 700° C.

In the case of the magnesium-antimony cell system, a lower-melting supporting electrolyte is needed to bring the liquid range of the electrolyte 20 down from the melting point of magnesium antimonide and within the liquid range of magnesium, which boils at 1100° C. Preferably, the liquid electrolyte 20 has a liquid range permitting a cell operating temperature close the melting temperatures of the electrode elements. Prime candidates for supporting electrolyte in a magnesium-antimony-magnesium antimonide system are sodium sulfide, lithium sulfide, calcium sulfide, magnesium sulfide and potassium sulfide. Other additives may include sodium selenide, lithium selenide, sodium antimonide and small amounts of other selenides, tellurides and/or halides.

Lead added to the antimony electrode at about 10 mole percent will become more concentrated as the liquid electrodes shrink. As the antimony fraction of the electrode 16 reaches a critically low level, the open circuit voltage of the cell 10 drops significantly which can be used as an indicator that the cell should not be discharged further.

For an antimony positive electrode 16 at high cell operating temperatures, bare steel is not an appropriate construction material because antimony alloys with iron, making it susceptible to corrosion. However, at temperatures below 738° C., iron and liquid antimony react to form an electronically conductive compound, iron antimonide, which could protect the steel container 22. In another design, the portion of the container 22 contacting the positive electrode 16 is steel protected from corrosion by a graphite layer.

Figure 2A:
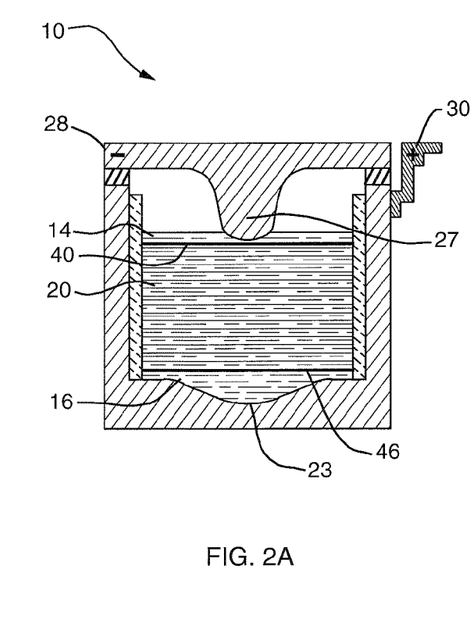
FIGS. 2A-2C are vertical sections illustrating the charging process of a self-assembling ambipolar electrodeposition cell of the invention.
Figure 2B:
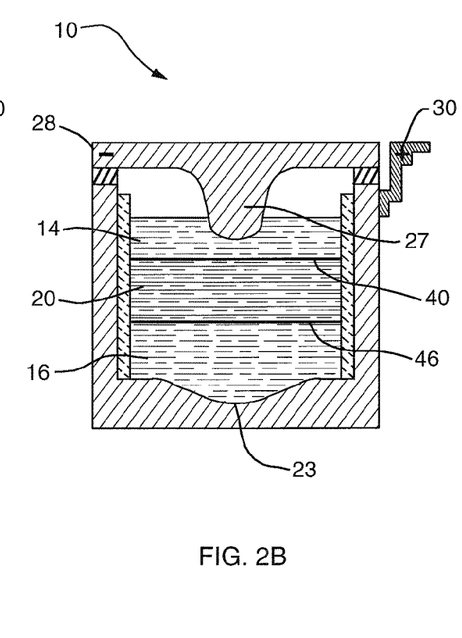
Figure 2C:
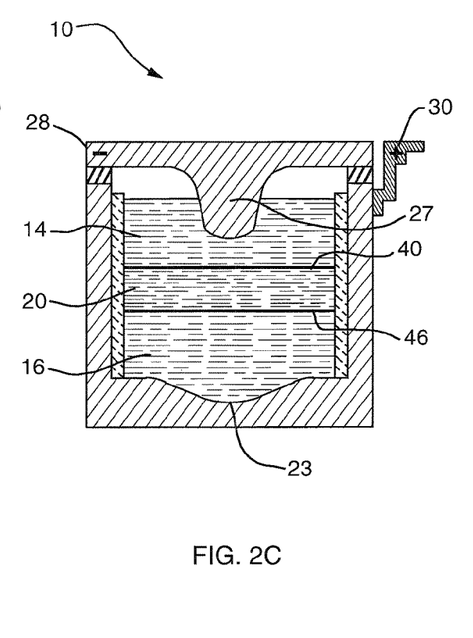

FIGS. 2A-2C illustrate the charging process for the cell 10. FIG. 2A shows the cell 10 in its discharged state. For purposes of illustration, discussion of the figures is made with reference to magnesium-antimony as an exemplary chemistry. Before charging, most of the magnesium and antimony are present as ions dissolved in the liquid electrolyte 20. The negative electrode 14 meets the electrolyte 20 at a magnesium-electrolyte interface 40. The positive electrode 16 meets the electrolyte 20 at an antimony-electrolyte interface 46. The terminals 28 and 30 are connected to an external circuit to initiate charging. As is shown in FIG. 2B, charging effects transfer of mass from the electrolyte 20 to the electrodes 14 and 16, causing the interfaces 40 and 46 to approach one another. During charging, electrons travel from the external circuit through the negative current collector 27 into the magnesium negative electrode 14. The molten magnesium is electronically conductive and allows electrons to pass from the negative current collector 27 to the magnesium-electrolyte interface 40. Electrons are unable to travel into the electrolyte 20 because it is electronically insulating. Electrons combine with magnesium cations at the interface 40, creating metallic magnesium that accrues to the negative electrode 14 where it accumulates, causing the magnesium-electrolyte interface 40 to move away from the negative current collector 27.

Current is carried across the electrolyte 20 by the movement of $Mg^{2+}$ toward the magnesium-electrolyte interface 40 and the movement of $Sb^{3-}$ toward the antimony-electrolyte interface 46. At the antimony-electrolyte interface 46 the antimony anions lose electrons to the positive electrode 16 to create elemental antimony that accrues to the positive electrode 16 where it accumulates, causing the antimony-electrolyte interface 46 to move away from the positive current collector 23. The freed electrons travel through the electronically conductive antimony positive electrode 16, through the positive current collector 23 and to the external circuit through the positive terminal 30. FIG. 2C shows the cell 10 in its final charged state.

Figure 3A:
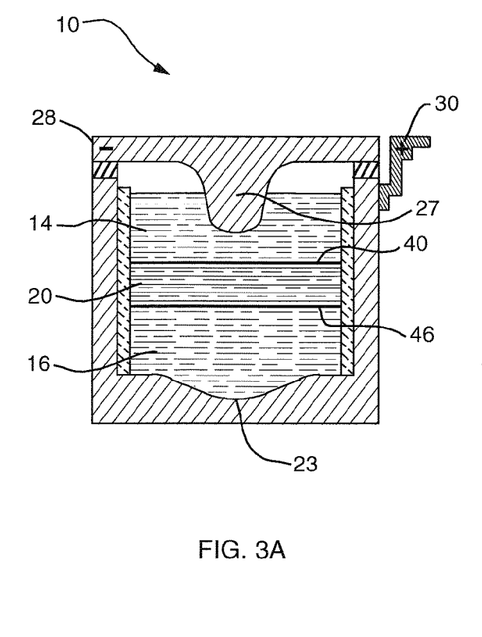
FIGS. 3A-3C are vertical sections illustrating the discharging process of a self-assembling ambipolar electrodeposition cell of the invention.
Figure 3B:
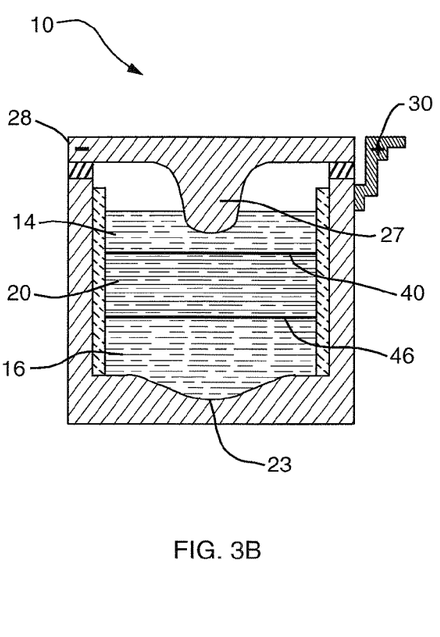
Figure 3C:
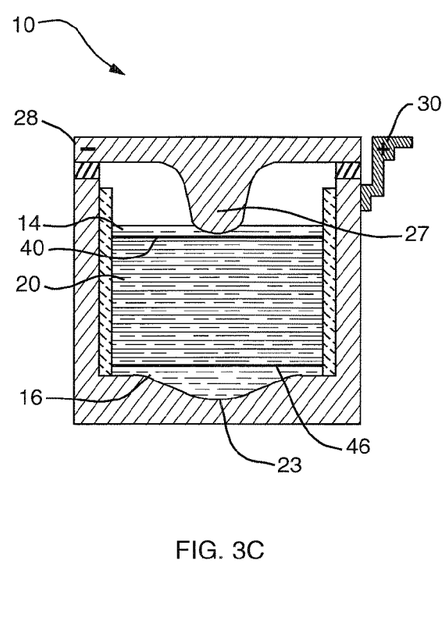

FIGS. 3A-3C illustrate discharging the cell 10. FIG. 3A shows the cell 10 in a charged state. Again, with reference to a magnesium-antimony chemistry, before discharging most of the magnesium and antimony are in their respective electrodes 14 and 16. The terminals 28 and 30 are connected to an external circuit to initiate discharging. As is shown in FIG. 3B, discharging effects transfer of mass from the electrodes 14 and 16 to the electrolyte 20, causing the interfaces 40 and 46 to retreat from one another. During discharging, electrons travel from the external circuit through the positive current collector 23 into the antimony positive electrode 16. The electrons pass from the positive electrode current collector 23 to the antimony-electrolyte interface 46. At the interface 46 neutral antimony in the electrode 16 gains electrons to create trivalent antimony ions that enter the negative electrolyte 20, thereby diminishing the positive electrode 16 and causing the antimony-electrolyte interface 46 to move toward the positive current collector 23.

Current is carried across the electrolyte 20 by the movement of $Mg^{2+}$ and $Sb^{3-}$ away from their respective electrolyte interfaces 40 and 46. At the magnesium-electrolyte interface 40 neutral magnesium in the electrode 14 releases electrons to create divalent magnesium cations which enter the electrolyte 20, thereby diminishing the negative electrode 14 and causing the magnesium-electrolyte interface 40 to move toward the negative current collector 27. The freed electrons travel through the electronically conductive negative electrode 14, through the negative current collector 27 and to the external circuit through the negative terminal 28.

FIG. 3C shows the cell 10 in its final discharged state. Rather than constructing the cell with a stoichiometric ratio of the negative and positive electrode elements corresponding to the reaction compound, i.e. Sb:Mg::2:3, an excess of the negative electrode metal is supplied so that some will be present to make contact with the negative current collector 27 even in the fully discharged state.

Figure 4:
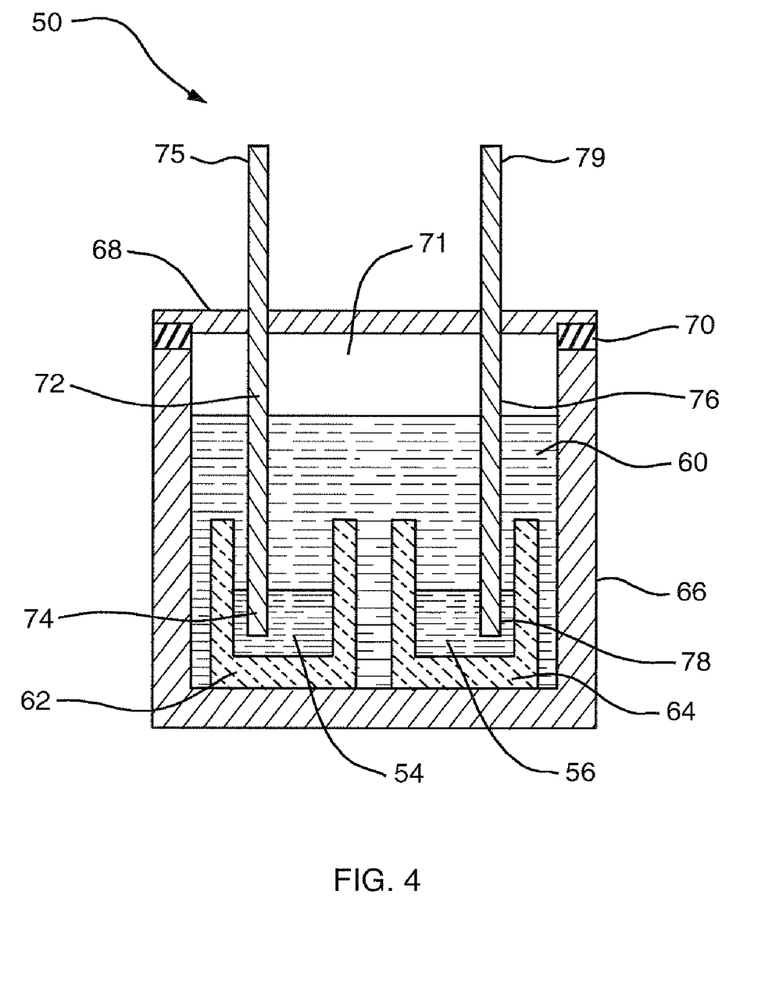
FIG. 4 is a vertical section illustrating an ambipolar electrodeposition energy storage cell having a side-by-side electrode configuration.

With reference to FIG. 4, an energy storage cell 50 of the invention houses three liquid constituents: a molten metal pool 54 that serves as negative electrode; a liquid metalloid pool 56 that serves as positive electrode; and an ionically conductive liquid electrolyte 60 overlaying the side-by-side electrodes 54 and 56. A container 62 holds the negative electrode element 54, a second container 64 holds the positive electrode 56, and both insulating containers 62 and 64 sit in a cell housing 66. The electrolyte 60 fills the cell housing 66 sufficiently to submerge both containers 62 and 64 so as to maintain a respective interface between the electrolyte 60 and each of the electrodes 54 and 56.

The cell is covered by a nonconductive lid 68. A seal 70 between the housing 66 and the lid 68 confines the cell contents to the housing. An inert gas layer 71 overlaying the electrolyte 60 accommodates volume changes in the three-constituent system during charging and discharging. Optionally, the lid 68 or seal 70 incorporates a safety pressure valve.

A rod 72 passes through and is suspended from the lid 68 and dips into the negative electrode 54. The end of the rod 72 in the electrode 54 serves as the negative current collector 74, while the distal end 75 serves as the negative terminal for connection for an external source or sink. A rod 76 passes through and is suspended from the lid 68 and dips into the positive electrode 56. The end of the rod 76 in the electrode 56 serves as the positive current collector 78, while the distal end 79 serves as the positive terminal for connection for an external source or sink.

If the cell is constructed so that the electrode containers are in contact, containers 62 and 64 are of nonconductive materials to avoid shorting the electrochemical pathway of the cell reaction. The cell housing 66, the electrode containers 62 and 64, and the current collectors 74 and 78 must be of a material resistant to attack by the molten salt electrolyte 60, such as graphite.

A cell 50 containing a molten metal layer 54 of zinc (density 7.1 g/ml), a liquid metalloid layer 56 of tellurium (density 6.3 g/ml) and an electrolyte 60 of zinc telluride dissolved in zinc chloride (density 2.9 g/ml) is a system of immiscible liquids having the requisite conductivity modes for constituting the cell shown in FIG. 4. The molten salt dissolves more than 20 mole percent of the reaction compound ZnTe and provides ionic conductivity chiefly by movement of zinc cations ($Zn^{2+}$) and chloride anions ($Cl^-$), with negligible electronic conductivity. In an alternate chemistry, zinc bromide or zinc iodide is used as supporting electrolyte for the zinc telluride reaction product. The cell operating temperature is preferably about 710° C.

During charging and discharging, the constituents behave equivalently to those illustrated in FIGS. 2 and 3. With reference to a zinc-tellurium system, as electrons from an external circuit pass through the negative electrode, zinc and tellurium ions are transferred from the liquid electrolyte to the negative and positive electrodes, respectively, thereby storing electrical energy. The enlarged electrodes and depleted electrolyte represent an energy reservoir which can be tapped at will. To discharge, the external load receives electrons from the negative electrode, the electrode elements electrodissolve and produce their reaction compound.

The all-liquid ambipolar electrodeposition chemistries of the invention exhibit fast kinetics and very high current densities, as great as 1 A/cm$^2$, or even greater than 5 A/cm$^2$. In general, cell voltages are small. For example, the dissociation potential of magnesium antimonide at 700° C. is 0.42 V. The actual open circuit voltage of a magnesium-antimony cell is influenced by the activities of the ions in the electrolyte solution, as expressed by the Nernst equation. Thus the cell potential falls as the cell discharges. The activities likely exhibit large nonidealities which may shift the open circuit voltage of that system to values greater than 1 V. Zinc-tellurium cells likely have similar potentials.

In one approach, scalability is exploited in a single large cell of the invention—on the order of a few meters cubed—that operates to transfer and store energy by ambipolar electrodeposition. In another embodiment, a battery including many cells of the invention connected in series confers a higher battery voltage with improved efficiency and more practical integration with the power electronics necessary to serve on large-scale systems. In yet another embodiment a large array of cells is interconnected with series and parallel connections for increased robustness with respect to failure due to individual cell malfunction.

Figure 5A:
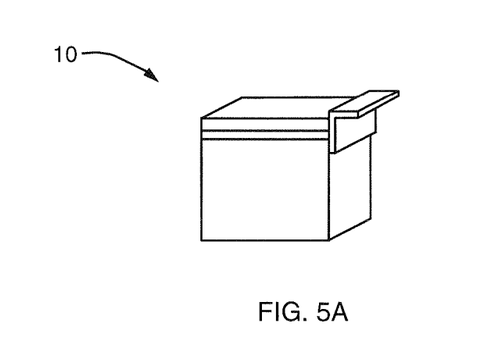
FIG. 5A shows a single cell of the invention.
Figure 5B:
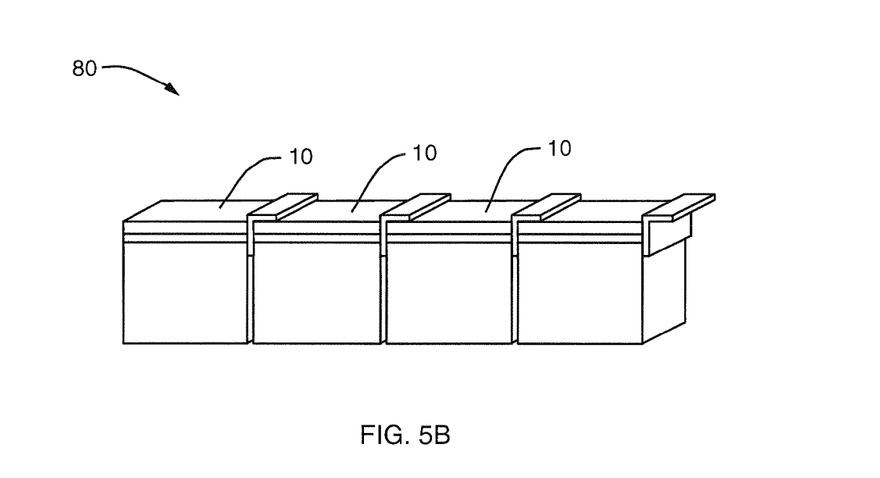
FIG. 5B shows a linear assembly of four cells and FIG. 5C shows a 16-cell array.
Figure 5C:
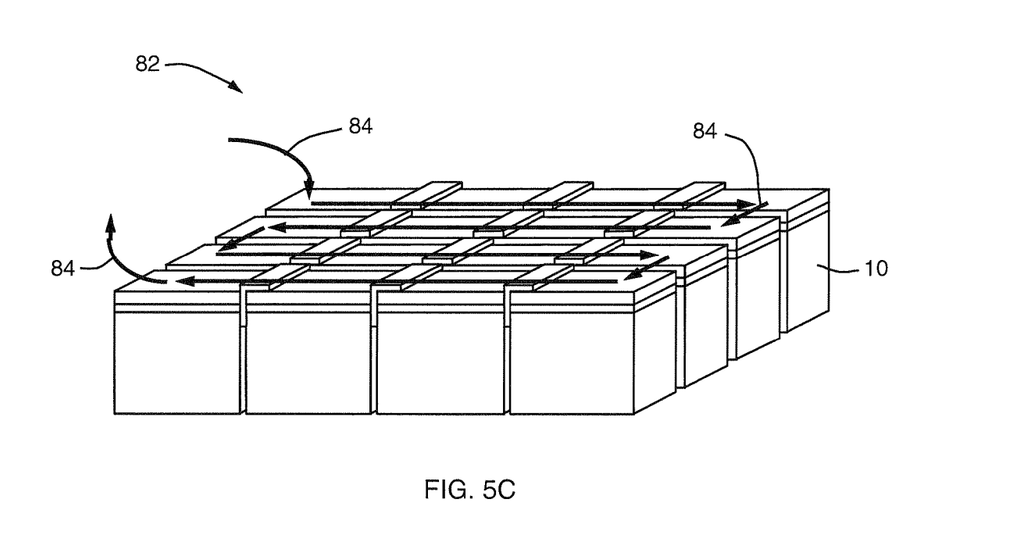

In one embodiment, a cell of the type shown in FIG. 1 is used to make a battery of more usable voltage in the following way. FIG. 5A shows in perspective view the cell 10 of the configuration type shown in FIG. 1. FIG. 5B shows a linear assembly 80 formed of four such cells 10 connected in series. In FIG. 5C, four linear assemblies 80 are joined to form an array 82 of 16 cells connected in series, in which the direction of electron movement during charging is indicated by arrows 84. Such arrays are stacked and electrically joined six high into modules of 96 cells to create a battery having an open-circuit voltage on the order of 100 V.

The cell of the invention is not limited to any particular method of being brought to or remaining at its operating temperature. The constituents may be melted in a separate heated chamber with sufficient superheat to allow transfer to the cell housing. In another approach external heaters are used before or during operation, placed, for example, in the cell housing wall. Or, the cell may be self-heating during operation through applied overpotentials. Techniques for achieving and maintaining operating temperatures of molten constituents are known to those skilled in the practice of high temperature extractive electrometallurgy.

Practical aspects of electrometallurgical systems potentially helpful to implementing the invention, such as construction of high-temperature apparatus for use with molten salts and liquid metals, and management of temperature profiles in their use, have been described in the prior art. For example, the construction and operation of the Hall-Héroult cell for aluminum extraction has been described, for example, in U.S. Pat. Nos. 4,999,097 and 5,185,068, the entire disclosures of which are incorporated herein by reference.

Although specific features of the invention are included in some embodiments and drawings and not in others, it should be noted that each feature may be combined with any or all of the other features in accordance with the invention.

It will therefore be seen that the foregoing represents a highly advantageous approach to storage for large-scale and commercial energy management. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An apparatus for exchanging electrical energy with an external circuit, the apparatus comprising:
   a. at least one electrochemical cell having an operating temperature, the cell comprising
      i. a liquid negative electrode having a first density and comprising a first element, the first element being a metal;
      ii. a negative current collector in contact with the negative electrode for exchanging electrons with the negative electrode;
      iii. a liquid positive electrode having a second density and comprising a second element, the second element being a metalloid in the elemental oxidation state;
      iv. a positive current collector in contact with the positive electrode for exchanging electrons with the positive electrode; and
      v. a liquid electrolyte, having a third density and comprising a dissolved cation of the first element and a dissolved anion of the second element, the electrolyte being in contact with the negative and positive electrodes;
   b. a negative terminal in electrical contact with the negative current collector for connection to the external circuit; and
   c. a positive terminal in electrical contact with the positive current collector for connection to the external circuit.

2. The apparatus of claim 1 wherein the operating temperature is greater than 500° C.

3. The apparatus of claim 1 wherein the operating temperature is greater than 700° C.

4. The apparatus of claim 1 wherein the at least one electrochemical cell comprises a plurality of electrically connected cells.

5. The apparatus of claim 1 wherein the first element is one of magnesium, potassium, sodium, lithium, calcium, cadmium and zinc.

6. The apparatus of claim 1 wherein the second element is one of arsenic, antimony, bismuth, selenium and tellurium.

7. The apparatus of claim 1 wherein the liquid electrolyte further comprises a supporting electrolyte.

8. The apparatus of claim 1 wherein the liquid electrolyte is in contact with the negative electrode over a first surface having an area and with the positive electrode over a second surface.

9. The apparatus of claim 8 wherein electrical current passes through the area at a current density greater than 1 A/cm$^2$.

10. The apparatus of claim 8 wherein electrical current passes through the area at a current density greater than 5 A/cm$^2$.

11. The apparatus of claim 1 wherein at least one of the external circuit is an electrical power plant.

12. The apparatus of claim 1 wherein at least one of the external circuit is a power transmission line.

13. The apparatus of claim 1 wherein at least one of the external circuit is a commercial facility.

14. The apparatus of claim 1 wherein at least one of the external circuit converts renewable energy to electricity.

15. The apparatus of claim 1 wherein the apparatus serves as an uninterruptible power supply.

16. The apparatus of claim 1 wherein the first density is greater than the third density, the second density being greater than the third density.

17. The apparatus of claim 16 wherein the negative electrode and the positive electrode are disposed mutually adjacently in the cell, the negative electrode being electronically insulated from the positive electrode, the liquid electrolyte overlaying the negative electrode and the positive electrode.

18. The apparatus of claim 16 wherein the liquid metal first element is zinc.

19. The apparatus of claim 18 wherein the liquid metalloid second element is tellurium, the reaction compound being zinc telluride.

20. The apparatus of claim 18 wherein the supporting electrolyte is zinc chloride.

21. The apparatus of claim 1 wherein the second density is greater than the third density, the second and third density being greater than the first density.

22. The apparatus of claim 21 wherein the negative electrode overlays the liquid electrolyte, the liquid electrolyte overlaying the positive electrode.

23. The apparatus of claim 21 wherein the first element is magnesium.

24. The apparatus of claim 23 wherein the second element is antimony, the reaction compound being magnesium antimonide.

25. The apparatus of claim 23 wherein the second element is tellurium, the reaction compound being magnesium telluride.

26. The apparatus of claim 21 wherein the second element is antimony.

27. A method of temporarily storing electrical energy from an external circuit, the method comprising:
   a. providing at least one electrochemical cell comprising:
      i. a liquid negative electrode, having a first density and comprising a first element, the first element being a metal;
      ii. a negative current collector in contact with the first element for exchanging electrons with the first element;
      iii. a liquid positive electrode, having a second density and comprising a second element, the second element being a metalloid in the elemental oxidation state;
      iv. a positive current collector in contact with the second element for exchanging electrons with the second element; and
      v. a liquid electrolyte, having a third density, in contact with the negative and positive electrodes comprising a cation of the first element and an anion of the second element;
   b. electrically connecting the external circuit to the negative and positive current collectors; and
   c. operating the external circuit so as to drive simultaneous reduction of the cations in the liquid electrolyte to form the first element at the negative electrode and oxidation of the anion in the liquid electrolyte to form the second element at the positive electrode, thereby storing energy from the external circuit.

28. The method of claim 27 further comprising the step of electrically connecting an external load to the negative and positive current collectors so as to allow simultaneous oxidation of the first element to cations at the negative electrode and reduction of the second element to anions at the positive electrode, thereby providing power to the external load.

29. The method of claim 27 wherein the cell is at a temperature greater than 500° C.

30. The method of claim 27 wherein the cell is at a temperature greater than 700° C.

31. The method of claim 27 wherein the at least one electrochemical cell comprises a plurality of electrically connected cells.

32. The method of claim 27 wherein the first element is one of magnesium, potassium, sodium, lithium, calcium, cadmium and zinc.

33. The method of claim 27 wherein the second element is one of arsenic, antimony, bismuth, selenium and tellurium.

34. The method of claim 27 wherein the liquid electrolyte comprises a mutual reaction compound of the first and second elements.

35. The method of claim 34 wherein the liquid electrolyte further comprises a supporting electrolyte.

36. The method of claim 27 wherein the liquid electrolyte is in contact with the negative electrode over a first surface having an area and with the positive electrode over a second surface.

37. The method of claim 36 wherein electrical current passes through the area at a current density greater than 1 $A/cm^2$.

38. The method of claim 36 wherein electrical current passes through the area at a current density greater than 5 $A/cm^2$.

39. The method of claim 34 wherein the step of operating the external circuit so as to drive simultaneous reduction of cations and oxidation of anions electrolyzes the reaction compound.

40. The method of claim 28 wherein the external circuit is an electrical power plant.

41. The method of claim 28 wherein the external circuit is a power transmission line.

42. The method of claim 28 wherein the external circuit is a commercial facility.

43. The method of claim 28 wherein the external circuit converts renewable energy to electricity.

44. The method of claim 28 wherein the apparatus serves as an uninterruptible power supply.

45. The method of claim 28 wherein the first second density is greater than the third density, the third density being greater than the third first density.

46. The method of claim 45 wherein a pool of the negative electrode and the positive electrode are disposed mutually adjacently in the cell, the negative electrode being electronically insulated from the positive electrode, the liquid electrolyte overlaying the negative electrode and the positive electrode.

47. The method of claim 45 wherein the first element is zinc.

48. The method of claim 47 wherein the second element is tellurium, the electrolyte further comprising a reaction compound, the reaction compound being zinc telluride.

49. The method of claim 48 wherein the supporting electrolyte is zinc chloride.

50. The method of claim 27 wherein the second density is greater than the third density, the third density being greater than the first density.

51. The method of claim 50 wherein the negative electrode overlays the liquid electrolyte, the liquid electrolyte overlaying the positive electrode.

52. The method of claim 50 wherein the first element is magnesium.

53. The method of claim 34 wherein the second element is antimony, and the reaction compound is magnesium antimonide.

54. The method of claim 34 wherein the second element is tellurium and the reaction compound is magnesium telluride.

55. The method of claim 50 wherein the second element is antimony.

* * * * *

UNITED STATES PATENT AND TRADEMARK OFFICE
CERTIFICATE OF CORRECTION

| | |
|---|---|
| PATENT NO. | : 8,268,471 B2 |
| APPLICATION NO. | : 11/839413 |
| DATED | : September 18, 2012 |
| INVENTOR(S) | : Donald R. Sadoway et al. |

It is certified that error appears in the above-identified patent and that said Letters Patent is hereby corrected as shown below:

In Col. 13, line 48
replace "cations"
with "cation"

Signed and Sealed this
Fifth Day of February, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,268,471 B2 | Page 1 of 1 |
| APPLICATION NO. | : 11/839413 | |
| DATED | : September 18, 2012 | |
| INVENTOR(S) | : Sadoway et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,265 days.

Signed and Sealed this
Twenty-third Day of February, 2016

Michelle K. Lee
*Director of the United States Patent and Trademark Office*